C. C. ALLEN.
METHOD OF MAKING PISTON PACKING RINGS.
APPLICATION FILED SEPT. 7, 1915.
1,190,500.
Patented July 11, 1916.
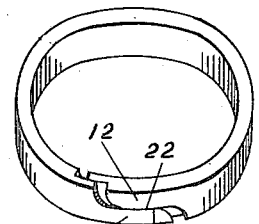
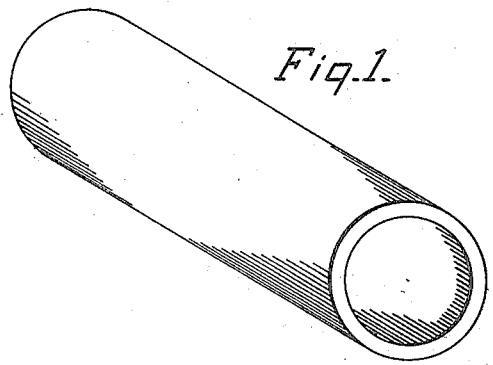
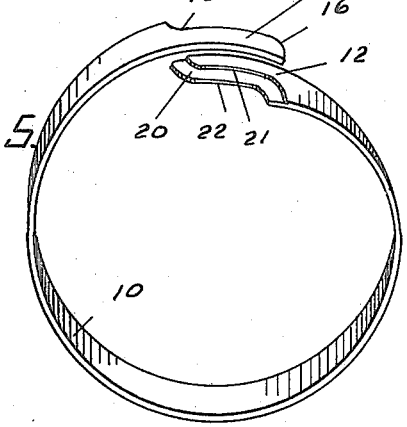
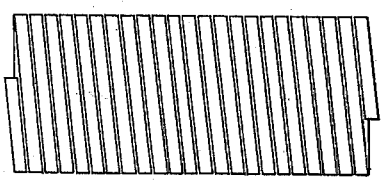
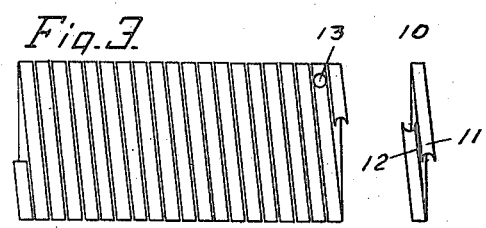
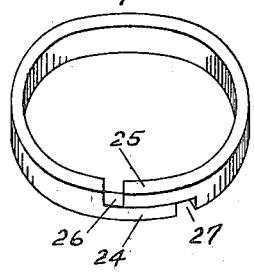
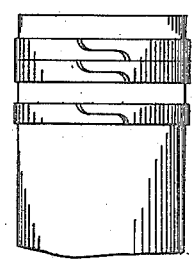
WITNESSES:
C. L. Brown
L. L. Hasson
INVENTOR
Charles C. Allen
BY
Rich & Manning
ATTORNEY

UNITED STATES PATENT OFFICE.

CHARLES C. ALLEN, OF KANSAS CITY, MISSOURI.

METHOD OF MAKING PISTON PACKING-RINGS.

1,190,500.     Specification of Letters Patent.    Patented July 11, 1916.

Application filed September 7, 1915. Serial No. 49,298.

*To all whom it may concern:*

Be it known that I, CHARLES C. ALLEN, a citizen of the United States of America, residing at Kansas City, in the county of Jackson and State of Missouri, have invented a certain new and Improved Method of Making Piston Packing - Rings, of which the following is a specification.

The ordinary packing rings employed upon a piston in the cylinders for steam and gas engines and pumps are broken, so as to provide for the expansion of the ring to fit the cylinder. Obviously, the openings which permit the rings to expand also permit the passage of the steam or gas, as well as oil, the leakage of the steam or gas preventing full expansion of either steam or gas within the cylinders.

To enable the packing rings to effectively resist such leakage and form a joint, whose parts are retained in close contact during expansion and contraction, and by the tension self imparted by the ring is the object of my invention, and which is attained in the following manner, reference being had to the accompanying drawing, forming a part of this specification, and in which drawing like numerals of reference indicate like parts in all the figures.

In the drawings: Figure 1. is a view in perspective of the hollow cylinder, from which the packing rings are preferably made. Fig. 2. is a side view of the spiral coil formed from the cylinder. Fig. 3. is a view of the spiral coil, as seen in Fig. 2, with a portion shown detached, to form the packing ring. Fig. 4. is an isometric view of the portion of the coil showing the method of making the parts of the joint. Fig. 5. is an enlarged, isometric view, showing the ring reversed in position, and the other part of the joint completed and in readiness to be sprung into place. Fig. 6. is an isometric view of the packing ring, ready for use. Fig. 7. is a view of a piston, showing the rings assembled thereon. Fig. 8. is a view of a transverse joint, made by halving the parts and the parts sprung together.

In the preferred manner of making my improved packing ring, a cylinder, of suitable material, such as cast iron, and of the requisite dimensions and proper thickness, is cut through its outer and inner surfaces longitudinally and spirally, in the most suitable manner, to form a spiral coil, as seen in Fig. 2. At one end of the coil, a section 10 of the coil is removed, as seen in Fig. 3, this section being of the requisite length to form the ring and the overlapping parts 11 and 12, from which the joint is to be made. For convenience of separation, a round opening is made in the coil, as at 13, and the sides of the opening being cut diametrically to the opening, the section of the coil is readily removed. The ring being held in a vertical position with the inner, lateral surface of the overlapped part 11 upwardly, a portion of the said part from the line of the periphery of the ring inwardly a distance approximately one-half the distance toward the inner edge of the ring is cut away, to form a bearing surface 14, parallel with the outer surface of the ring. At the inner end of this bearing surface, a curve 15 is formed, the surface of which is gradually formed and extends to the line of the outer surface of the ring. The outer portion of the bearing surface is curved downwardly, as at 16, to the line of the inner surface of the ring.

From the line of the outer edge of the ring a rabbet 17 is cut in the direction of the periphery, beginning at point 17$^x$, a short distance inwardly from the line of the curved portion 15 and extending inwardly one-half the thickness of the ring toward the periphery of the ring and in the curved line of said inner surface of the ring. This rabbet extends inwardly to a point between the bearing surface 14, and the inner edge of said overlapped part 11, and at said point a bearing surface 18 is formed, parallel with said bearing surface 14. The curve 15 at the inner end of the bearing surface is made in the direction of and extended to the line of the outer edge portion of said part 11, and the outer end of said bearing surface is cut away within the line of the rearwardly-curved portion 16, of the bearing surface 14. This foreshortening of the bearing surfaces in the respective curved portions 15 and 19 admits of the expansion and contraction of the opposite parts of the joint. The ring is now reversed in position, and the outer surface of the part 12 brought into position for operation, as seen in Fig. 5, and the said part cut away in precisely the same manner, but in a reverse direction to the part 11, the rabbet within the bearing surface 21 and 22, being curved outwardly and corresponding with the bearing surfaces 14 and 18, of the part 11 of the joint.

In practice, ordinary revoluble metal cutting wheels perform the operation of cutting both bearing surfaces and rabbet at one time. The ring at this stage of the operation preserves the spiral conformation, and the parts are moved forcibly against the tension of the ring in opposite directions, one part 12 is forced inwardly beneath and past the inner surface of the other part 11, and into the spring engaged position as seen in Fig. 6, the rabbets 17 and 20 fitting closely, and under the tension inherent to the parts 11 and 12, of the body of the ring, the bearing surfaces 21 and 22, of the parts 12, which oppose the spring tension of the body of the ring, are held in close frictional contact by said tension, during the sliding movement coincident with and to compensate for the wear of the cylinder in adjustment, the escape of steam past said bearings being effectually prevented, and also excluding oil.

In the process of cutting the parts 11 and 12, the parts may be cut entirely across, leaving halved portions 24 and 25, and bearing surfaces 26 and 27 (as seen in Fig. 8), respectively, the parts 24 and 25 being sprung into engaging positions, in the same manner as the parts 11 and 12, spaces being permitted between the notches in the halved portions, for expansion and contraction of the ring. When the parts of the joint are sprung together, the peripheral, or outer surface of the ring is ground, to give smoothness and evenness thereto, afterward the rings are assembled upon the piston, as seen in Fig. 7.

It is obvious that instead of forming the section 10 from the coil, as seen in Fig. 3, the same may be cast from suitable metal, in which the tension of the metal from torsion is obtained to retain the adherence of one bearing surface of the joint with the other, and the utility of the ring obtained in the most effective manner.

I am aware of spring washers, but no one heretofore has made a packing ring with a joint the parts of which are held together constantly by spring tension.

Having fully described my invention, what I now claim as new, and desire to secure by Letters Patent is:

1. The herein described method of making piston packing rings, consisting in forming the body of the ring spirally, and with terminal parts extending past each other forming parts of a complete joint in the reverse outer portions of said terminal parts, and springing the said parts of said joint in opposite directions past each other and into constant spring and joint forming engagement.

2. The herein described method of making piston packing rings, consisting in making the body of the ring from a spiral coil, forming the parts of a joint in the reverse outer portions of the terminal portions of the coil opposed to each other and moving forcibly said parts in opposite directions against the tension of the body of the coil into joint-forming positions and spring engagement with each other.

3. The herein described method of making piston packing rings, consisting in forming a ring from a normally spiral coil, making reverse bearing surfaces in the outer portions of the terminal parts of the coil opposed to each other and moving forcibly said parts against the tension of the said coil in opposite directions past each other into joint forming positions and into constant spring engagement.

4. The herein described method of making piston packing, consisting in forming a ring spirally from a metal body, with terminal parts extending past each other, forming rabbets in the outer portions of the said terminal parts, then applying torsion to the said parts of the coil and moving said parts in opposite directions past each other into constant spring engagement and against the tension of said spiral body.

5. The herein described method of making piston packing, consisting in forming a ring from a spiral sectional part of a coil, whose terminal parts extend past each other, forming rabbets in the said terminal parts, and shoulders in a parallel plane with the lateral surfaces of the ring and moving said parts in opposite directions past each other against the torsion of the coil and into constant spring engagement.

6. The herein described method of making from a metal cylinder a spiral coil, separating a part of said coil to form a ring with terminal portions extending past each other, forming parts of a joint in the outer surfaces of the said terminal portions of said ring, and rabbets in their respective upper and lower surfaces and moving said terminal portions of the ring in opposite directions past each other into joint forming positions and spring engagement with each other.

CHARLES C. ALLEN.

Witnesses:
 Geo. A. Anderson,
 Annie L. Greer.